United States Patent [19]

Bray

[11] 4,070,280
[45] Jan. 24, 1978

[54] MANUALLY OPERABLE REVERSE OSMOSIS APPARATUS

[75] Inventor: Donald Thedore Bray, Escondido, Calif.

[73] Assignee: Desalination Systems, Inc., Escondido, Calif.

[21] Appl. No.: 742,658

[22] Filed: Nov. 17, 1976

[51] Int. Cl.$^2$ .................. B01D 13/00; B01D 33/00; C02B 1/82
[52] U.S. Cl. .................. 210/23 H; 210/359; 210/321 R; 210/494 M; 210/450
[58] Field of Search .............. 210/321 R, 359, 494 M, 210/450

[56] References Cited
U.S. PATENT DOCUMENTS

| | | | |
|---|---|---|---|
| 1,463,067 | 7/1923 | Crary | 210/359 |
| 2,330,625 | 9/1943 | Reppmann | 210/359 |
| 3,417,870 | 12/1968 | Bray | 210/494 X |
| 3,830,372 | 8/1974 | Manjikian | 210/321 R |
| 3,966,616 | 6/1976 | Bray | 210/450 X |

Primary Examiner—Frank A. Spear, Jr.
Assistant Examiner—David R. Sadowski
Attorney, Agent, or Firm—Clement H. Allen

[57] ABSTRACT

A reverse osmosis apparatus includes a pump for pressurizing feed water introduced into a pressure resistant container in which is slidably mounted a semipermeable membrane cartridge. A rod, attached to an end of the semipermeable membrane cartridge, passes slidably and sealingly through one end of the pressure resistant container and is connected to means for reciprocal actuation. Means, preferably common, are provided to actuate the pump and the rod which imparts longitudinal reciprocal motion to the rod and the membrane cartridge within the pressure resistant container, thereby providing improved turbulence and circulation of the feed water through the semipermeable membrane cartridge over the membrane surfaces. The common means may be in the form of a lever operated by a handle or pedal, or by a power source such as an electric motor.

12 Claims, 3 Drawing Figures

MANUALLY OPERABLE REVERSE OSMOSIS APPARATUS

BACKGROUND OF THE INVENTION

1. The Field of the Invention

This invention relates to apparatus for purifying water by reverse osmosis operable by a handle or pedal.

2. The Prior Art

The prior art has proposed and used a variety of types of apparatus for purifying water and other liquids by reverse osmosis, and which may be operated by electrical or mechanical means, or by hand or foot action. The amount of work required, however, is large and conservation of human energy is necessary for operation of reverse osmosis units used in emergency situations, as in lifeboats. Therefore, separation of the normal functions of the high pressure pump, namely pressurization and replacement of extracted pure water and circulation is desirable. The power required to circulate a desirably high volume of highly saline water, such as sea water, over membrane surfaces solely by action of the high pressure pump would seem to be excessive. Ordinarily, the volume of flow over the membrane surfaces is limited by a high pressure pump action which is designed primarily for raising the feed liquid to operating pressure in amount to replace the volume passing through the membrane and recovered as purified product, plus an excess to maintain a desirable solute concentration in the blow-down or brine. Such considerations, however, do not solve the problem of providing sufficient flow over the membrane surfaces to ensure turbulence for elimination of deleterious layers of high solute concentration liquid at the boundary layer between membrane and liquid, and desirable flushing action to wash away solids and particulate matter which otherwise might be deposited on the membrane surface. Increasing the overall flow through the pressure resistant container can, obviously, be obtained by increasing the amount of feed liquid pumped, but this entails a corresponding increase in high pressure pumping costs and discard of blow-down or brine which is much more dilute than that which would normally result from efficient operation of the membrane.

A spiral wound membrane cartridge, as described in U.S. Pat. Nos. 3,417,870, 3,493,496 and 3,542,203, among others, is advantageously employed in reverse osmosis systems because it provides a large membrane surface area within a comparatively small volume. Necessary pressure container dimensions are, therefore, comparatively small to house a spiral wound cartridge of large membrane surface area. Circulation of feed water in a spiral wound cartridge system is generally longitudinally through internal channels in the cartridge, or cartridges, and sufficient pump volume output has been heretofore required to insure adequate feed solution flow through the cartridge to reduce boundary layer effects to a tolerable level. Large volume pumping requirements of spiral wound cartridges, due to their small internal space relationships, have not favored their use in hand or foot operated systems, particularly those used for conversion of high salt content feed, such as sea water, at high operating pressure.

Another type of semipermeable membrane cartridge providing a large membrane surface area per unit volume is one in which the membranes are formed as hollow fine fibers which can be arranged longitudinally in a cartridge or pack. Feed liquid passed through the cartridge over or through the hollow fine fibers under pressure produces a purified water product transported through the membrane walls and which is separately collected.

A system that could employ large surface area membrane cartridges more efficiently, and which could employ human power for operation producing required pressurization and also circulation of feed water over membrane surfaces would be very advantageous.

SUMMARY OF THE INVENTION

The apparatus and method of this invention, for purifying water by reverse osmosis, comprises a tubular pressure resistant container housing a semipermeable membrane cartridge having generally longitudinal, that is from end to end, internal channels for passage of feed water therethrough; a pump for introducing feed water under elevated pressure into the pressure resistant container near one end thereof and means for actuating the pump; means for collecting water purified by transport through the semipermeable membrane in the semipermeable membrane cartridge, and means for releasing said feed water as brine from the pressure resistant container near the other end thereof while maintaining operating pressure therein as by a conventional restrictor or back pressure control valve.

The semipermeable membrane cartridge is materially shorter than the pressure resistant container in which it is housed, and is longitudinally slidable therein. A rod, which may be hollow to collect purified product water from the interior of the semipermeable membrane cartridge, is attached to one end of the semipermeable membrane cartridge and passes slidably and sealingly through one end of the pressure resistant container.

The means for actuating the pump and the means for actuating the rod which imparts longitudinal reciprocal motion to the semipermeable membrane cartridge attached thereto and during passage of feed water therethrough, may be common means. In an embodiment adapted for human operation, the means for actuating the pump include a lever pivoted on a suitable fixed support, and which is connected at a point along its length to the rod. The lever is operable by a human agency, as for example, hand or foot, through a handle or pedal, to impart reciprocal, or back and forth, motion to one end of the lever to thereby impart reciprocal motion of the rod and the semipermeable membrane cartridge within the pressure resistant container, and also simultaneous actuation of the pump.

The lever may be pivoted on its fixed support either at one end, or intermediate the points of connection of the rod and the pump actuating mechanism, or between the connection of the rod and pump actuating mechanism and the handle or pedal. These connections may be arranged so that the lever will cause movement of the semipermeable membrane cartridge in the same or opposite direction as the general movement of feed fluid within the pressure resistant container during pumping, as by a piston pump. Means such as a peripheral sliding seal, which may comprise a pair of opposite facing chevron seals, may be employed to reduce or prevent blow-by or excessive leakage between the outer surface of the semipermeable membrane cartridge and the interior surface of the pressure resistant container during reciprocal motion of the semipermeable membrane cartridge with respect to the pressure resistant container.

Electric motor actuating means may also be employed for the pump or rod movement or both.

It will be apparent from the following detailed description that the flow of feed water or liquid according to this invention will be generally longitudinally through the semipermeable cartridge following channels which run internally from end to end of the cartridge, for example, through the porous fabric or grid-like backing material in a spiral wound semipermeable cartridge, which is described in the first and second full paragraphs of column 5 of the aforementioned U.S. Pat. No. 3,417,870. Such type of construction is to be clearly distinguished from membrane cartridge assemblies in which the membrane itself is wrapped around the outer surfaces of so-called membrane elements as described in U.S. Pat. No. 3,830,372; the flow of feed water in such systems being clearly over the surfaces of the membrane covered elements.

DESCRIPTION OF PREFERRED EMBODIMENTS

Figure 1:
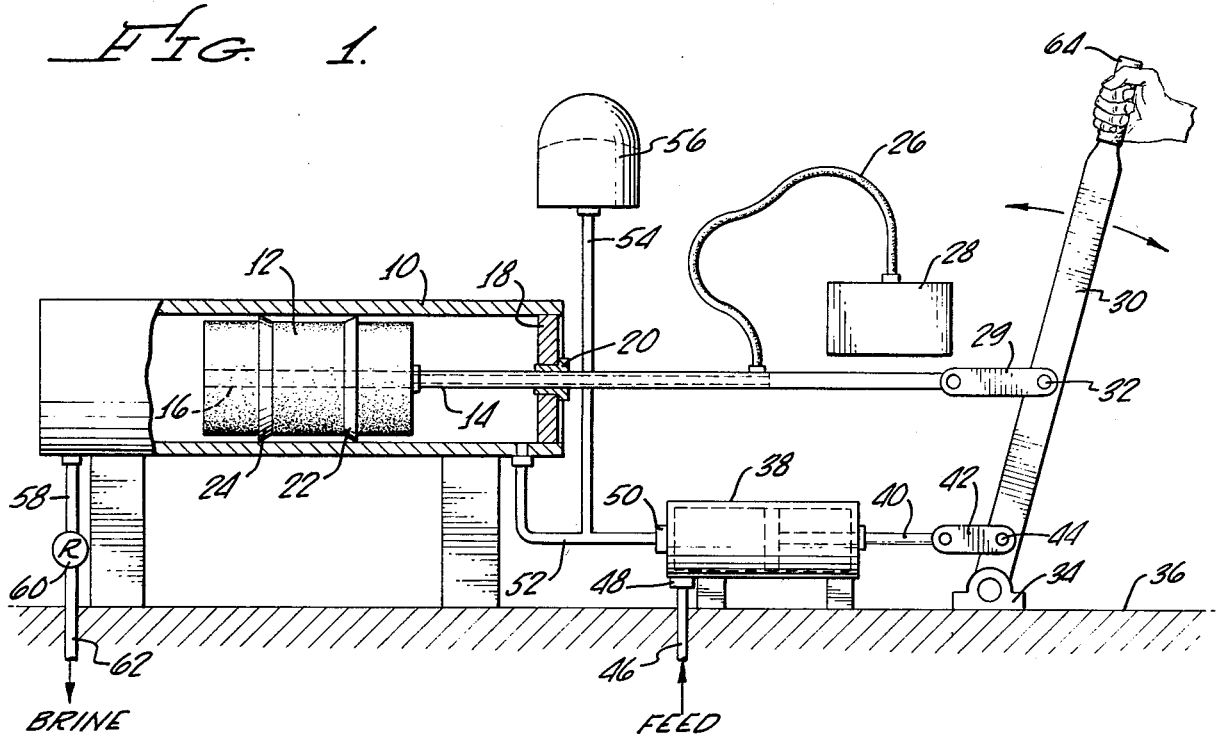
FIG. 1 illustrates a general side view, partly broken out, of apparatus embodying features of this invention.

Referring now to FIG. 1, the apparatus comprises a fixedly mounted tubular pressure resistant container 10, in which is housed a semipermeable membrane cartridge 12, which has generally longitudinal channels, that is from end to end for passage of feed solution therethrough, as exemplified by the so-called spiral wound type. Semipermeable membrane cartridge 12 is materially shorter than pressure resistant container 10, that is shorter by a substantial amount. It is slidable therein, and has attached to one of its ends a rod 14, which may be hollow as shown, and which communicates interiorly with the purified water or permeate collector, such as central tube 16 of semipermeable cartridge 12, and which passes slidably through a suitably attached end 18 of pressure resistant container 10. A suitable gland or packing 20 seals rod 14 where it passes slidably through pressure resistant container end 18.

A suitable arrangement for controlling blow-by, or substantial leakage, between the exterior surface of semipermeable membrane cartridge 12 and the interior surface of pressure resistant container 10 may be provided, which, in the embodiment illustrated, comprises a pair of opposite facing chevron seals 22 and 24. These will seal the exterior surface of semipermeable membrane cartridge 12 to the interior surface of pressure resistant container 10 when reciprocal, or back and forth, motion is imparted to semipermeable membrane cartridge 12 within pressure resistant container 10. The interior of hollow rod 14 communicates with the interior of flexible hose 26, which in turn, leads to purified water or permeate container 28.

An end of link 29 is pivotally attached to the projecting end of rod 14, and has its other end pivotally attached to lever 30 as at 32. The lower end of lever 30 is pivotally attached to mount 34, which is fixedly supported on a firm base or ground structure 36.

Piston pump 38 is also fixedly mounted on structure 36 and has its piston rod 40 pivotably attached by link 42 to lever 30 as at 44. Feed water to be purified is introduced through pipe 46 and check valve 48, into the cylinder of pump 38, from which it is pumped through check valve 50 and pipe 52 into one end of pressure resistant container 10. A branch pipe 54 is connected to pipe 52 leading to a conventional accumulator 56 which smoothes out the pulsations from pump 38. A brine disposal pipe 58 communicates with the other end of pressure resistant container 10 leading to a restrictor or back pressure control valve 60, from which the brine is released to drain or sewer through pipe 62. The restrictor or back pressure control valve 60 is arranged to release brine through pipe 62 while maintaining operating pressure of feed liquid inside pressure resistant container 10. The free end of lever 30 is formed into a handle 64 by which it may be moved back and forth, thereby actuating pump 38 through link 42 and its piston rod 40, and also imparting reciprocal motion to semipermeable membrane cartridge 12 within pressure resistant container 10 through link 29 and rod 14.

Figure 2:
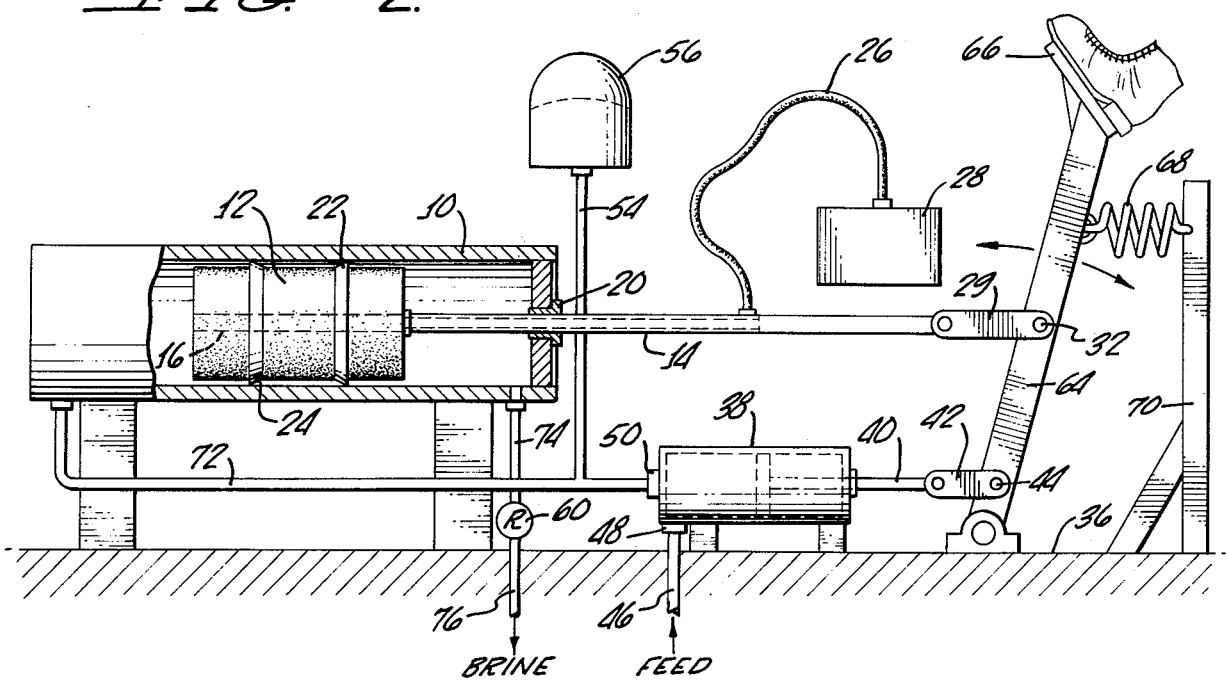
FIG. 2 illustrates a general side view, partly broken out, of an alternative embodiment of the apparatus of this invention.

In FIG. 2 is illustrated an alternative embodiment of the invention in which pressure resistant container 10, with slidable cartridge 12 housed therein, and seals 22 and 24 controlling blow-by, and central purified water collector 16 communicating with hollow rod 14 which is connected to flexible hose 26 and container 28, and pump 38 with its piston rod 40, are identical with these elements similarly identified in FIG. 1. The actuating lever 64 is, however, slightly different from lever 30 of FIG. 1, in that it is provided at its free end with a pedal 66 instead of handle 64 and because pedal operation is essentially a mechanism for unidirectional force application, spring 68 is attached to lever 64 and to firmly mounted post 70 to provide return movement of pedal 66 and lever 64. Also in the embodiment of FIG. 2, the output pipe 72 from pump 38 is connected to the left hand end (in the drawing) of pressure resistant container 10 instead of the right hand end as seen in FIG. 1. The pipe 54 to accumulator 56 is the same as in FIG. 1. Links 29 and 42 between lever 64 and rod 14 and piston rod 40 are also the same as in FIG. 1. Brine release pipe 74 is connected into the right hand end of pressure resistant container 10 and leads through resistor 60, as before, to drain line 76.

It will be seen that as lever 30 in FIG. 1 is moved from right to left (in the drawing), feed water is pumped from right to left through pressure container 10 and semipermeable cartridge 12, while the same actuating motion also moves semipermeable membrane cartridge from right to left. However, due to comparative sizes of the piston in pump 38 and the diameter of semipermeable membrane cartridge 12, there will be substantial flow of feed water or fluid through semipermeable membrane cartridge 12. On the return stroke, substantially greater fluid flow through semipermeable membrane cartridge 12 will be obtained.

In the embodiment of FIG. 2, as lever 64 is moved from right to left, semipermeable membrane cartridge 12 is moved right to left, but the flow of feed liquid from pump 38 is moving left to right. Therefore, a counter current movement of semipermeable membrane cartridge 12 provides a very high degree of turbulence in the fluid flowing over the membrane surfaces. On the return stroke, semipermeable membrane cartridge 12 is moving from left to right, which is a condition of parallel flow, although the relative rates of cartridge movement and fluid flow will provide substantial turbulence in the liquid flowing through semipermeable membrane cartridge 12.

Figure 3:
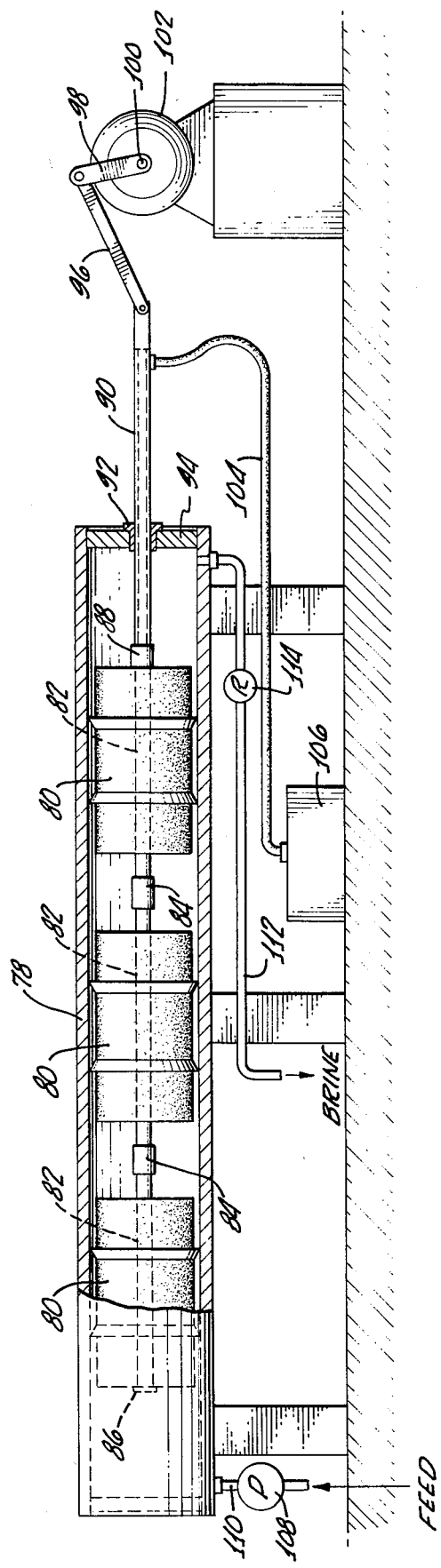
FIG. 3 illustrates a general side view, partly broken out, of another alternative embodiment of this invention.

In FIG. 3 is illustrated an embodiment of the invention in which an elongated pressure resistant container 78 houses three semipermeable membrane cartridges 80, whose central purified water collectors 82 are linked by tubular connectors 84. The left hand end of central collector 82 of the left hand semipermeable membrane cartridge 80 is sealingly capped as at 86, while the right hand end of central collector 82 of right hand cartridge 80 is connected as at 88 to hollow rod 90, which passes slidably through seal 92 of end 94 of pressure resistant container 78. Connecting rod 96 is pivotably attached to the end of rod 90 and also to the end of crank 98, which is fixedly attached to shaft 100 of electric motor 102, which is preferably of slow speed or gear reduced output type. Flexible hose 104 transfers purified liquid from hollow rod 90 into storage tank 106. Impure feed water is pressurized by high pressure pump 108 independently powered by a conventional electric motor (not shown), and introduced into the left hand end of pressure resistant container 78 through pipe 110. Brine or blow-down is released from the other end of pressure resistant container 78 through pipe 112, in which is placed back pressure control valve or resistor 114, which releases brine while maintaining operating pressure within pressure resistant container 78.

In operation of the apparatus of this invention, as illustrated in FIG. 1, a suitable supply of water to be purified, such as sea water, may be introduced through pipe 46 into pump 38 in which its pressure can be raised to, for example 500 to 1000 psi, by reciprocal back and forth motion of lever 30 by means of human energy applied to handle 64. This also causes reciprocal motion back and forth of semipermeable membrane cartridge 12 inside pressure resistant container 10. The flow of pressurized feed water through container 10, and the turbulence provided by the reciprocal motion of cartridge 12 inside pressure resistant container 12 results in efficient production of purified water which is collected from semipermeable membrane cartridge through hollow rod 14, hose 26 and into container 28. Actuation of lever 30 provides a method in which the semipermeable membrane cartridge 12 is slidably enclosed in pressure resistant container 10 and reciprocal motion is imparted to cartridge 12 with respect to container 10 while passing impure feed water therethrough. In a preferred embodiment, the impure water is pressurized and reciprocal motion is imparted to cartridge 12 by a common energy source such as manual actuation of lever 30, which operates both the cartridge reciprocating rod 14 and pump piston rod 40.

Operation of the embodiment illustrated in FIG. 2 will be essentially the same as that of FIG. 1 except that human energy is applied by foot to pedal 66 to impart reciprocal motion through common lever 64 to both cartridge reciprocating rod 14 and pump piston rod 40.

Operation of the embodiment illustrated in FIG. 3 will comprise operating pump 108 by a conventional electric motor drive (not shown) and actuating cartridge reciprocating rod 90 by an independent electric motor 102.

If desired, pump 108 may also be actuated by electric motor 102, which will function as common means for actuating both pump and cartridge reciprocating mechanism.

As an example of comparative conventional reverse osmosis operation, a feed of municipal water is pumped at high pressure through a nominal 3-inch diameter semipermeable membrane cartridge having an over-all cross sectional area (less the collector tube) of 44 cm$^2$, to produce 25 gallons per day of purified water or permeate and 25 gallons per day of blow-down or brine. Volume flow through the cartridge can be calculated to be 2.2 cm$^3$ per second and the cross sectional area of the cartridge corrected for the cross section area of the plastic mesh spacer sheet (about 50%) would be 22 cm$^2$. The linear liquid flow through the cartridge would then be about 0.1 cm per second.

Operation according to this invention by imparting a longitudinal reciprocal motion to the same cartridge within its container to provide a 6-inch travel each way 24 times a minute would result in a 144-inch per minute or 6.1 cm per second relative travel or liquid flow. Correcting for the cross sectional area of the spacer sheet, the linear flow over the membrance surface would be about 12 cm per second, disregarding the flow resulting from the pump, which would be at least in part cancelled out by the bidirectional motion of the cartridge. It is seen that the linear flow over the membrane surface is increased about 100 times over that obtained by conventional pumping only operation. The turbulence resulting from this increased flow is extremely effective to reduce or eliminate boundary layers, adjacent membrane surfaces, and which contain a high concentration of solute. The increased flow and resulting turbulence is also valuable to provide a high velocity washing action over the membrane surface, as well as other surfaces inside the cartridge to reduce or eliminate adhesion or settling of precipitated particles, sludge, and other foreign material. Of additional importance is that the high pressure pumping requirements of the system can be designed to supply feed liquid in amount required to produce the purified product liquid and a blow-down or brine representing efficient separation and concentration without considering turbulent flow requirements. The blow-down or brine can be of sufficiently high solute concentration to produce required product water amount and purity without retaining so high a solute concentration that osmotic efficiency is affected. The necessary turbulent flow conditions can be obtained without affecting these and other operating parameters.

I claim:

1. Apparatus for purifying water by reverse osmosis comprising; a tubular pressure resistant container housing a semipermeable membrane cartridge comprising a membrane, a purified water transfer sheet, and a spacer sheet spirally wound around a central purified water collection tube, and providing generally longitudinal channels for passage of feed water therethrough; a pump for introducing impure feed water under elevated pressure into said tubular pressure resistant container near one end thereof for longitudinal passage through said semipermeable membrane cartridge, and means for actuating said pump; and means for releasing said feed water as brine from said tubular pressure resistant container near the other end thereof while maintaining operating pressure therein; in which the improvement comprises:

a. said semipermeable membrane cartridge being of cylindrical configuration and materially shorter than said tubular pressure resistant container, and of diameter to fit slidably inside said tubular pressure resistant container;

b. rod means attached to said semipermeable membrane cartridge and passing slidably and sealingly through an end of said tubular pressure resistant container for imparting longitudinal reciprocal motion of said semipermeable membrane cartridge within said tubular pressure resistant container during passage of feed water therethrough; and including a reciprocating hollow rod communicating with the central purified water collection tube of said semipermeable membrane cartridge, for transferring purified water from said semipermeable membrane cartridge to the exterior of said tubular pressure resistant container.

2. Apparatus according to claim 1, in which a plurality of said semipermeable membrane cartridges are linked together in end-to-end relationship within said pressure resistant container.

3. Apparatus according to claim 1, in which common means actuate said pump and impart reciprocal motion to said semipermeable membrane cartridge within said pressure resistant container.

4. Apparatus according to claim 3, in which said common means comprise a lever pivotably attached to a fixed support and operable by a human agency.

5. Apparatus according to claim 4, in which said lever includes a handle for manual operation.

6. Apparatus according to claim 5, in which said lever includes a pedal for foot operation.

7. Apparatus according to claim 1, in which means are provided for controlling blow-by between the outer surface of said semipermeable membrane cartridge and the interior surface of said pressure resistant container.

8. Apparatus according to claim 7, in which said means for controlling blow-by between said outer surface of said cylindrical semipermeable membrane cartridge and the said interior surface of said tubular pressure resistant container comprise a peripheral sliding seal around said cylindrical semipermeable membrane cartridge of outside diameter slightly less than the inside diameter of said tubular pressure resistant container.

9. Apparatus according to claim 7, in which said means for controlling blow-by between said outer surface of said cylindrical semipermeable membrane cartridge and said interior surface of said tubular pressure resistant container comprise a pair of opposite facing chevron seals.

10. A method for purifying water by passing impure feed water under elevated pressure longitudinally through a cylindridal semipermeable membrane cartridge in which the improvement comprises:

a. slidably enclosing said cylindrical semipermeable membrane cartridge in a tubular pressure resistant container, said cylindrical semipermeable membrane cartridge being shorter than said tubular pressure resistant container;

b. introducing said impure feed water into said tubular pressure resistant container near one end thereof for longitudinal passage through said cylindrical semipermeable membrane cartridge, and releasing said impure feed water as brine from said pressure resistant container near the other end thereof while maintaining operating pressure therein;

c. imparting longitudinal reciprocal motion of said cylindrical semipermeable membrane cartridge with respect to said tubular pressure resistant container, while passing impure feed water therethrough; and, d. transferring purified water from said cylindrical semipermeable cartridge through a hollow rod passing slidably and sealingly through an end of said tubular pressure resistant container to the exterior of said tubular pressure resistant container.

11. A method according to claim 10, in which the said impure water is pressurized and said reciprocal motion is imparted to said semipermeable membrane cartridge by a common energy source.

12. Apparatus according to claim 1, in which said rod means attached to said semipermeable membrane cartridge for imparting reciprocal motion to said semipermeable membrane cartridge within said pressure resistant container comprise a hollow rod communicating interiorly with the purified water collector of said semipermeable membrane cartridge and passing sealingly and slidably through an end of said pressure resistant container.

* * * * *